No. 632,272. Patented Sept. 5, 1899.
P. D. MILLOY.
TROLLEY CATCHER.
(Application filed Apr. 29, 1899.)
(No Model.) 2 Sheets—Sheet 1.
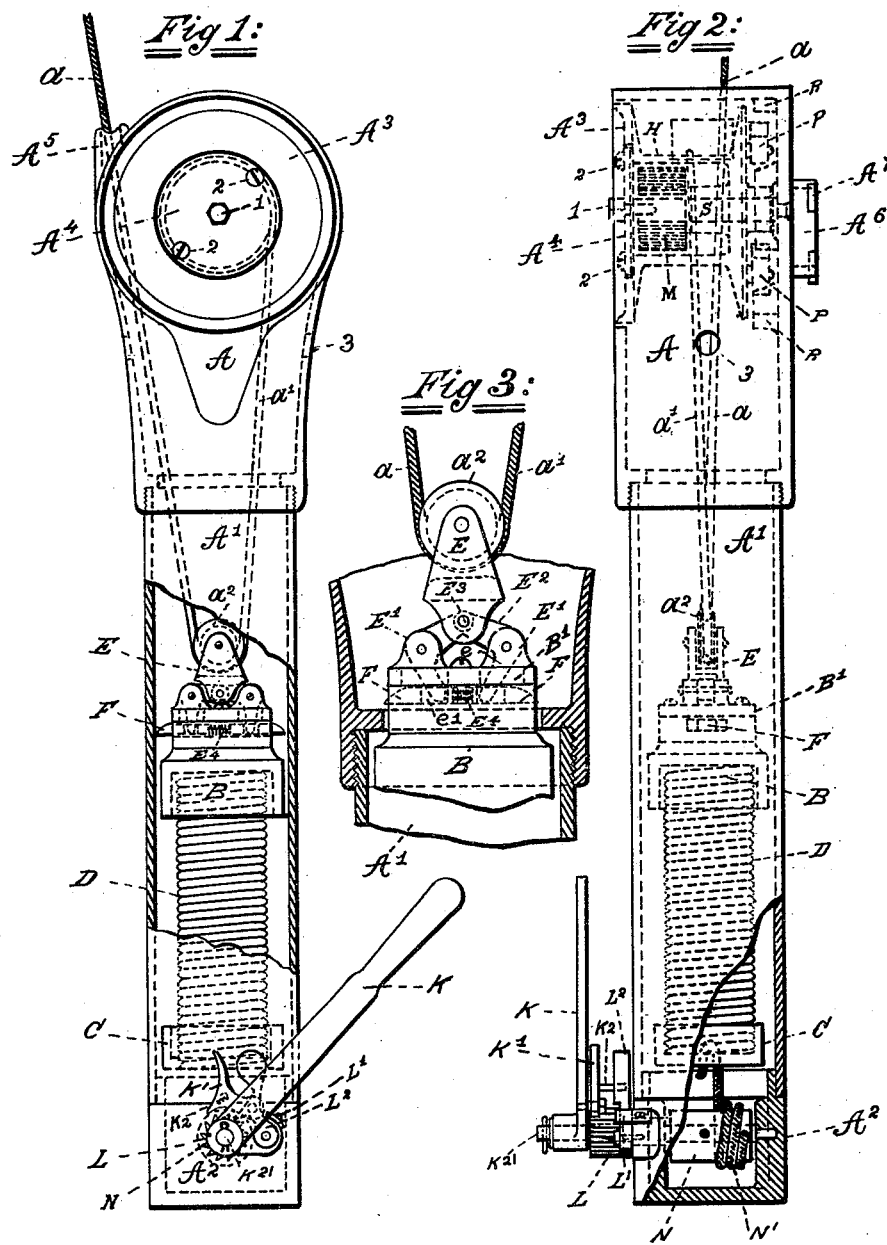
WITNESSES:
J. F. Boice
Florence M. Westhoven
INVENTOR.
Peter D. Milloy
BY John F. Kerr
ATTORNEY.

No. 632,272.
P. D. MILLOY.
TROLLEY CATCHER.
(Application filed Apr. 29, 1899.)
Patented Sept. 5, 1899.
(No Model.)
2 Sheets—Sheet 2.
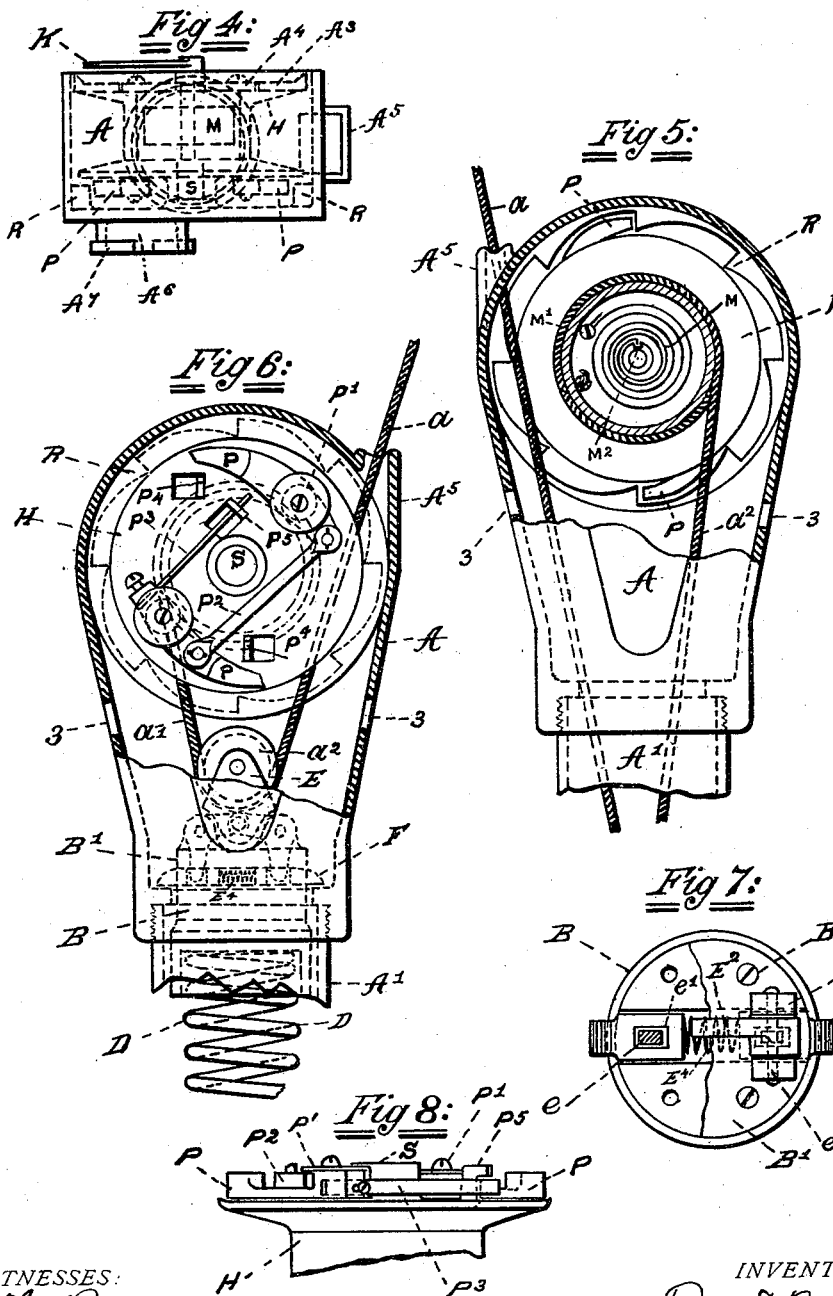
WITNESSES:
J. F. Bocce
Florence M. Westhoven
INVENTOR.
Peter D. Milloy
BY John F. Kerr
ATTORNEY.

UNITED STATES PATENT OFFICE.

PETER D. MILLOY, OF BUFFALO, NEW YORK.

TROLLEY-CATCHER.

SPECIFICATION forming part of Letters Patent No. 632,272, dated September 5, 1899.

Application filed April 29, 1899. Serial No. 714,961. (No model.)

*To all whom it may concern:*

Be it known that I, PETER D. MILLOY, a citizen of the United States, residing at Buffalo, in the county of Erie and State of New York, have invented certain new and useful Improvements in Trolley-Catching Devices, of which the following is a specification, reference being had therein to the accompanying drawings.

The object of my invention is to provide a device to regulate and control trolleys.

The invention may be called a "trolley-catcher," and relates to that particular class of trolley-catchers which automatically compensates for the differences in height of different parts of the trolley-wire by letting out the trolley guide-rope when the height increases, and vice versa, and which when the trolley-pole happens to leave the wire will prevent it from engaging and destroying the overhead wires.

The further object of my invention is to produce a device that will be easily managed and regulated and that will be simple in construction and durable.

The item of expense for damage done by trolley-poles jumping from the wire is a matter of no little consequence, and my device by making it next to impossible for the trolley-pole to do such damage accomplishes a much-desired result.

The further object of my invention is to produce a device that will accomplish the above-mentioned results and occupy as small a space as possible.

Referring to the accompanying drawings, consisting of two sheets and in which similar letters and figures of reference indicate like parts, Figure 1 is a front view of my invention, part sectional, portions of the cylindrical casing or barrel being broken away. Fig. 2 is a side view of same, part sectional, parts being broken away to show the mechanism in the lower portion of my machine. Fig. 3 is a detail showing my locking device. Fig. 4 is a plan view of the upper part of my device. Fig. 5 is a sectional detail view of the upper portion of my trolley-catcher viewed from the front, showing the take-up and let-off mechanism for the rope. Fig. 6 is a sectional detail view of the head of my trolley-catcher, portions thereof being broken away, showing back head of drum and the stop-motion. Fig. 7 is a detail view showing the locking-dogs; and Fig. 8 is a detail view showing locking-dogs of stop-motion shown in Fig. 6, but seen from the side.

The various mechanisms or devices which contribute to make up the works of my invention are inclosed in a casing, which may be divided, as indicated in the drawings, into the head A, barrel A', and foot $A^2$.

When placed in position, my invention, as shown in Fig. 1, will rest upon the rear platform of the car or vehicle and will be secured to the dashboard by means of any suitable securing device.

The trolley-cord $a$, which is attached to the trolley-pole, passes down through the guide-opening $A^5$ at one side of the head A into the barrel A' and around the sheave $a^2$ back to the head A and around the drum H, where it is secured to the outside of the barrel. In the notch $M^2$ of the stud S for the drum H is secured one end of the tension-spring M. The other end thereof is secured by the screw M' to the inside of the barrel of the drum. The front plate $A^3$ forms a part of the rope-drum H, and the plate $A^4$ is the cover for the box containing the spring M, which is secured on by means of the bolt 1 and the screws 2 2. The plate $A^3$ and the cover-plate $A^4$ form one head of the drum, and when the cover-plate $A^4$ is removed, which can be done by taking out the screws 2 2 and the bolt 1, the spring M is seen, as shown in Fig. 5. The spring M is coiled about the stud S, on which the drum H revolves. The stud S is secured to the back of the head of the casing A. The front end of the stud S is provided with a screw-threaded recess adapted to receive the screw-bolt 1. When the securing-bolt 1 and the screws 2 2 are taken out, the drum H may be lifted out of the casing-head A. The spring M lies inside of the barrel of the drum H, one end being secured in the notch in the stud S and the outer end being secured to the inner side of the barrel of the drum H. Fig. 5 is a sectional view through the center of the casing-head A and through the center of the barrel of the drum H and shows the ratchet-teeth R, which are secured inside the casing-head A on the inside of the back of the head.

On the back head of the drum H, I arrange my centrifugal locking device, which consists of the arms P, pivotally secured on the stud-pivots P' and which operate in unison and are pivotally connected by rod $P^2$. Stops $P^4$ for the arms P are formed by cutting the back head of the drum and turning up a part thereof, as shown in Fig. 6. A tension-spring is secured to the back portion of one of the arms P, the free end of said spring pressing against a stop $P^5$, which is formed by cutting the back head of the drum and turning the cut part upward. Said spring $P^3$ keeps the arms P closed in against the stops $P^4$. When the drum H is caused to revolve at an increased speed, the arms P are caused to separate, swinging outwardly on their pivots P', and the drum can revolve but a short distance, when the arms P engage the ratchet-teeth R on the inside of the back of the casing-head A, thereby locking the drum and preventing any further revolution thereof. While the trolley-pole is under the overhead trolley-wire and the car is not in motion, the ordinary variations in the height of the overhead wire will not be sufficient to increase the speed of the drum H to such an extent as to cause the arms P to spread by reason of the centrifugal force; but the sudden departure or release of the trolley-pole from the overhead trolley-wire would be sufficient to cause the said arms P to spread and engage the ratchet-teeth R and stop the revolution of the drum. Without or in the absence of such a sudden jerk or increase of the revolution of the drum the trolley-rope will be taken up and let off, meeting the exigency of the occasion, passing as it does around the sheave $a^2$ and around the drum H by reason of the tension of the spring M.

The cylindrical or barrel portion A' of the casing is secured to the head portion A of the casing, as shown in Fig. 3 of the drawings, the upper part of the barrel portion being screwed into the lower portion of the head until it reaches the projecting lip or annular shoulder shown in said figure. The lower portion or foot $A^2$ of the casing fits into the bottom of the barrel portion A' and may be secured therein by means of screws or in any other suitable manner.

The sheave $a^2$ is mounted to rotate in the clevis E. A strong spiral extension-spring D, secured in the top spring-box B and the bottom spring-box C, is located within the barrel portion A' of the casing. The top spring-box B has a cover-plate B', on which are projecting lugs E'. In said lugs levers $E^2$ are mounted on pivots, the upper ends of said levers being pivotally secured in the lower portion of the clevis E on pivot $E^3$. The lower ends of said levers $E^2$ enter a slot or opening in the dog-catches F. Said dog-catches slide in a slot in the top of the spring-box B. When the clevis E is pulled up, the lower ends of the levers draw in said dog-catches F, as shown in Fig. 3, and when said levers $E^2$ are not pulled up, as shown in Fig. 3, the said dog-catches F are forced out, so as to project beyond the sides of the spring-box B and to overlap or rest upon the projecting lip or annular shoulder by means of the expansion of the spiral spring $E^4$, which is located in the slot in the top of the spring-box B between the dog-catches F, as shown in Figs. 6 and 7. The cover-plate B' of the top spring-box B is secured to the spring-box B by means of screws $B^2$. In the lower portion or foot $A^2$ of the casing is mounted the drum N. A wire rope N' of suitable length is secured to the bottom of the spring-box C. The other end of said wire rope is secured to the said drum N and is wound about said drum by the operation of the lever-handle K. The drum N is secured to the stud $K^{21}$, and a ratchet-wheel L is secured to the same stud, but outside of the foot $A^2$. A ratchet-pawl K' is pivotally secured to the lever-handle K, so as to permit said pawl to engage said ratchet-wheel and turn the drum N and wind thereon the wire rope N'. The ratchet-pawl K' is provided with a pin $K^2$ to operate the catch $L^2$, which is pivotally secured to a shoulder on the outside of the foot $A^2$. A stop L' is secured to the foot $A^2$ to limit the backward motion of the catch $L^2$, and when the ratchet-pawl K' is pushed back from engagement with the ratchet-wheel L the pin $K^2$, projecting from the side of the ratchet-pawl, strikes the catch $L^2$ and throws it back against the stop L' and releases it from engagement with the ratchet-wheel L. The dog-catches F are provided with an opening or slot $e'$ to admit the ends of the arms $e$ of the levers $E^2$. By referring to the stop $P^5$ it will be seen that the portion of the head which is cut and turned up to form said stop projects over the spring $P^3$ and serves as a guide for the spring, as is shown in Fig. 8 in the drawings.

It will be observed by referring to the drawings that my invention when inclosed in the casing A, A', and $A^2$ will occupy but a very small space on the rear platform of the car and will present a neat appearance.

As is obvious, my invention not only provides a compensating feed mechanism to take up and let off the quantity of guide-rope required by the variations in the height of the overhead trolley-wire; but in case of accident or the unexpected jumping from or leaving the overhead trolley-wire by the trolley I provide another safety mechanism, which works simultaneously with the locking device which controls the trolley-rope, which safety mechanism provides for the immediate depression of the trolley and pole, removing them safely out of the plane of contact with the overhead wires. These two coacting mechanisms comprise the essential elements of my invention. By the one I control the trolley-rope and by the other I haul down the trolley-pole. By the second operation I pull down the trolley the distance I wish, said distance being regulated by the length of the wire rope wound on the drum in the foot $A^2$ and by expansion and contraction of the extension-spring D.

Having thus described and pointed out the essential parts of my invention, I will next explain its operation. The trolley-cord $a$ is secured to the trolley-arm and passes therefrom down to the casing-head A through the guide-opening $A^5$ to and around the sheave $a^2$. Said sheave $a^2$ is mounted to rotate in the clevis E. From the sheave $a^2$ the rope passes to the barrel portion of the cord-drum H. The said drum rotates on the stud S, and the trolley-cord $a$ is kept taut by means of the spring M, which is confined inside of the barrel portion of the drum. The usual spring on the base of the trolley-pole tends to keep the trolley-arm up in contact with the trolley-wire, and every variation in the height of the trolley-wire is met by the take-up and let-out of the trolley-cord $a$. When the rope slackens, it is taken up on the drum, and vice versa. The trolley-cord is thus kept taut at all times. The locking device on the back head of the drum H, which is operated by centrifugal force due to the rotary movement of the drum, is only called into operation in case of the trolley leaving the trolley-wire; but as my trolley-cord $a$ does not pass directly from the drum to the trolley-arm, but passes from the drum and around the sheave $a^2$ in the clevis E and then to the trolley-arm, the possibility of the trolley-arm leaving the trolley-wire is reduced to a minimum. The instant, however, that the trolley-pole leaves the trolley-wire the locking device is called into operation by the accelerated rotary movement of the drum, the letting off of the rope is thereby checked, and the upward tendency of the trolley-arm causes the rope $a$, which passes around the sheave $e^2$, to lift the clevis E, and the levers $E^2$ are drawn upward, the dog-catches F are drawn inwardly, releasing them from their normal position on the annular shoulder within the lower portion of the casing-head A, and the compression of the spiral extension-spring D pulls down the trolley-arm the distance required to lower it out of the plane of contact with the overhead wires. The extension-spring D may be made to pull down the trolley-pole any distance required, said distance being limited to the length of the wire cable N′, which is secured to the bottom spring-box C and is wound about the drum N by the manipulation of the lever-handle K. When it is desired to elevate the trolley-pole into contact with the trolley-wire, it is done as follows: The rope is drawn down a little, one-half an inch will do, which half-inch is taken up on the drum, thereby releasing the locking device on the back of the drum, and the pole then ascends to the trolley-wire, and to replace the mechanism in the barrel portion A′ to its normal working position, so that the dog-catches F will rest again upon the annular shoulder within the lower portion of the casing-head A, the lever-handle K is thrown back, the ratchet-pawl K′ and the operating-catch $L^2$ both being released from engagement with the ratchet-wheel L, when the whole may be lifted up into position by means of the trolley-cord $a$; or, if desired, the lever-handle K may be first thrown back, releasing the pawl K′ and the catch $L^2$ from engagement with the ratchet-wheel L, when the trolley-arm in going up will raise the mechanism in the barrel portion $a^3$ until the dog-catches F rest upon the annular shoulder within the casing-head A. When in that position, it is set again by the manipulation of the lever-handle K′, which winds the wire cable N′ around the drum N, thereby extending the extension-spring D. Thus it will be obvious that my invention keeps the rope taut all the time while the car is in motion, conveying the trolley-wheel around the curves, steadying the same, preventing of all vibration from the overhead wire, and when from some defect in the trolley-wire the trolley is thrown off my invention catches and pulls it down below the overhead-wire structure, thus preventing arcing between guy-wires and live wires, and preventing great destruction in power-house, such as blowing of plugs and fuses and blistering of armatures, which are the results of arcing of overhead wires.

With this my invention I better accomplish the purposes of the trolley-catcher, for which United States Letters Patent were granted to me on the 25th day of December, 1894.

While my invention may be secured or attached to the dashboard of a car in any suitable manner, one of the simplest is by means of clamps secured by bolts.

With this description of my invention, what I claim is—

1. In a trolley-controlling device, means for taking up and letting out the trolley-arm-operating rope, means for locking said feed mechanism, and a trolley-cord, in combination with an extension-spring, having an upper box or covering, lugs mounted on and integral with said box-covering, L-shaped levers pivotally mounted at the angle portion thereof in said lugs, a clevis, the upper ends of said levers being pivotally connected and mounted in the lower portion of said clevis, and a sheave mounted to rotate in the upper part of said clevis, around which the trolley-cord passes from feed mechanism to the trolley-pole, dog-catches located in a slot in said top spring-box, a spiral spring located in said slot between said dog-catches and adapted to force said dog-catches outwardly, said dog-catches being provided with an opening or slot to receive the lower end of said L-shaped levers, a wire cable, one end of which is secured to the bottom of said extension-spring, a drum to which the other end of said wire cable is secured and means for winding said cable around said drum, a casing to inclose the interdepending and coacting portions of said mechanism, the said drum for wire cable being mounted to rotate in the lower portion of said casing, and the top portion or head of said casing, being provided within with an annular shoulder adapted to support said extension-spring by means of the dog-catches, which when forced out overlap or rest upon said annular shoulder, all substantially as set forth.

2. In a trolley controlling and depressing device, the trolley-cord, a feed mechanism adapted to let off said rope and take up the slack, means for locking said feed-motion, a sheave around which said rope passes, in combination with a clevis in which said sheave is mounted to rotate, L-shaped levers pivotally connected and mounted in the lower portion of said clevis, an extension-spring provided with a top spring-box having a slot running transversely across the top thereof and provided with vertical lugs, said levers pivotally mounted in said lugs, dog-catches adapted to slide in said slot, a spiral spring located in said slot between said dog-catches and adapted to press said dog-catches outwardly, said dog-catches provided with a slot or opening to be engaged by the lower ends of said levers, a casing to inclose the whole, an annular shoulder located within the upper portion of said casing, and adjacent to the lower edge thereof to form a support for said extension-spring, said dog-catches when out to rest on said annular shoulder and means located in the bottom of said casing adapted to expand said extension-spring, all substantially as set forth.

3. In a trolley controlling and depressing device, a casing, inclosing the working portions or mechanism, a mechanism which consists of an extension-spring secured in the bottom of said casing dog-catches adapted to slide in the cover of said extension-spring, spiral spring located between said dog-catches, levers pivotally mounted on lugs of said spring-covering, the upper ends of said levers being pivotally secured in the lower portion of a clevis, the lower ends of said levers adapted to engage said dog-catches to draw them inwardly and a sheave mounted to rotate in the upper portion of said clevis, in combination with said clevis, a trolley-arm-operating rope passing around said sheave in said clevis, and a locking device to control the rope, and thereby pull up said levers, draw in said dog-catches, and cause the extension-spring to pull down the trolley free and clear of all overhead wires, substantially as set forth.

4. The combination with the trolley-rope feeding and locking mechanism of an extension-spring, a sheave mounted to rotate above, and connected with, said spring, the trolley-rope passing from the locking feed mechanism to said sheave and thence to the trolley-arm, means for extending said spring, the spring-actuated dog-catches, levers to release same, and a cylindrical casing to inclose the whole, substantially as set forth.

5. In a trolley controlling and depressing device, a casing provided with an internal annular shoulder in combination with an extension-spring, spring-actuated dog-catches adapted to rest upon said annular shoulder, a spring-box for top of said spring provided with a cover, L-shaped levers pivotally mounted on said cover, a clevis, the upper ends of said L-shaped levers being pivotally mounted in the lower portion of said clevis, the lower ends of said levers engaging said dog-catches, and a sheave around which the trolley-cord is adapted to pass, mounted to rotate in the upper part of said clevis, for the purposes specified and substantially as set forth.

6. In a trolley controlling and depressing device, an extension-spring, a casing provided with an internal annular shoulder, means for supporting said spring on said annular shoulder, means for extending said spring in combination with suitable means for automatically releasing said spring from said internal annular shoulder the instant the trolley leaves the trolley-wire, for the purposes specified and substantially as set forth.

7. In a trolley controlling and depressing device, an extension-spring, a drum beneath said spring, wire cable connecting said spring and said drum, a support for said spring, a lever and pawls to operate said drum for the distention of said spring, in combination with suitable means for releasing said spring from said support, for the purposes specified and substantially as set forth.

8. In a trolley controlling and depressing device, having an extension-spring for the depressing of trolley from the plane of contact with the overhead wire, a casing provided with an internal annular shoulder in combination with spring-actuated dog-catches adapted to rest on said annular shoulder, to support said extension-spring, a spring adapted to force said dog-catches to overlap and rest upon said annular shoulder, L-shaped levers, the lower ends of which are adapted to draw said dog-catches inwardly off said annular shoulder when the upper ends of said levers are drawn upwardly, a clevis in which the upper ends of said levers are pivotally secured and a sheave to receive the trolley-rope mounted to rotate in the upper portion of said clevis, for the purposes specified and substantially as set forth.

9. In a trolley controlling and depressing device, the trolley-rope, a spring-actuated drum to take up and let off said rope, and a device for locking said drum in combination with a sheave around which said rope passes, a clevis in which said sheave is mounted to rotate, spring-actuated dog-catches, a spring adapted to force said dog-catches outwardly, and levers, the upper ends of which are pivotally secured in said clevis, the lower ends of said levers adapted to engage and draw inwardly said dog-catches for the purposes specified and substantially as set forth.

10. In a trolley controlling and depressing device, the trolley-rope, a spring-actuated drum to take up and let off said rope, and a device for locking said drum in combination with a sheave around which said rope passes, a clevis in which said sheave is mounted to rotate, spring-actuated dog-catches, a spring adapted to force said dog-catches outwardly, and levers, the upper ends of which are pivotally secured in said clevis, the lower ends of said levers adapted to engage and draw inwardly said dog-catches, and a casing provided with an internal annular shoulder, an extension-spring upon and to which said sheave, clevis, levers and spring-actuated dog-catches are suitably mounted and secured, said annular shoulder adapted to support said extension-spring by means of the projecting spring-actuated dog-catches, for the purposes specified and substantially as set forth.

11. In a trolley controlling and depressing device, the combination with an extension-spring and means for extending the same, of the trolley-rope, sheave, clevis, L-shaped levers and spring-actuated dog-catches F F, substantially as set forth.

12. In a trolley controlling and depressing device, the combination with the extension-spring and means for extending the same, of the trolley-rope, sheave, clevis, L-shaped levers, spring-actuated dog-catches F F, and a casing provided with an annular shoulder, substantially as set forth.

In testimony whereof I affix my signature in presence of two witnesses.

PETER D. MILLOY.

Witnesses:
JOHN F. KERR,
I. F. BOICE.